United States Patent
Seo et al.

(10) Patent No.: US 9,864,239 B2
(45) Date of Patent: Jan. 9, 2018

(54) LIQUID CRYSTAL DISPLAY DEVICE

(71) Applicant: SAMSUNG DISPLAY CO., LTD., Yongin-si (KR)

(72) Inventors: Miseon Seo, Suwon-si (KR); Keumdong Jung, Seoul (KR); Kihwan Kim, Hwaseong-si (KR); Jooyeon Lee, Hwaseong-si (KR); Munsoo Park, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 39 days.

(21) Appl. No.: 15/011,795

(22) Filed: Feb. 1, 2016

(65) Prior Publication Data
US 2016/0320674 A1    Nov. 3, 2016

(30) Foreign Application Priority Data
Apr. 29, 2015   (KR) .................. 10-2015-0060623

(51) Int. Cl.
*G02F 1/1343*  (2006.01)
*G02F 1/1368*  (2006.01)
*G02F 1/1362*  (2006.01)

(52) U.S. Cl.
CPC ...... *G02F 1/134309* (2013.01); *G02F 1/1368* (2013.01); *G02F 1/13624* (2013.01); *G02F 1/136286* (2013.01); *G02F 2001/134345* (2013.01)

(58) Field of Classification Search
CPC .................. G02F 1/134309; G02F 1/1368
See application file for complete search history.

(56) References Cited

U.S. PATENT DOCUMENTS

| | | | |
|---|---|---|---|
| 6,495,858 B1* | 12/2002 | Zhang ................. | G02F 1/13624 257/350 |
| 2002/0085139 A1* | 7/2002 | Kim ..................... | G02F 1/1368 349/43 |
| 2002/0186331 A1* | 12/2002 | Chung ................. | G02F 1/1368 349/43 |

(Continued)

FOREIGN PATENT DOCUMENTS

| KR | 1020110111212 | 10/2011 |
|---|---|---|
| KR | 1020110111227 | 10/2011 |

(Continued)

*Primary Examiner* — Sang V Nguyen
(74) *Attorney, Agent, or Firm* — Cantor Colburn LLP

(57) ABSTRACT

A liquid crystal display ("LCD") device capable of easily setting up an accurate resistance ratio between thin film transistors, the LCD device includes a first substrate including a gate line and a data line, a second substrate opposing the first substrate, a liquid crystal layer between the first substrate and the second substrate, a first sub-pixel electrode in a first sub-pixel region of the first substrate, a second sub-pixel electrode in a second sub-pixel region of the first substrate, a first transistor connected to the gate line, the data line, and the first sub-pixel electrode, a second transistor connected to the gate line, the first transistor, and the second sub-pixel electrode, and a third transistor connected to the gate line, the second sub-pixel electrode, and a storage line, wherein one of the first, second, and third transistors includes a plurality of divided channel regions.

10 Claims, 15 Drawing Sheets

(56) References Cited

U.S. PATENT DOCUMENTS

| | | | | |
|---|---|---|---|---|
| 2004/0238822 A1* | 12/2004 | Meng | H01L 27/1255 | 257/72 |
| 2005/0140302 A1* | 6/2005 | Park | H01L 27/3251 | 315/169.3 |
| 2005/0161670 A1* | 7/2005 | Kimura | G02F 1/136286 | 257/59 |
| 2006/0208977 A1* | 9/2006 | Kimura | G09G 3/2014 | 345/76 |
| 2006/0238135 A1* | 10/2006 | Kimura | G09G 3/20 | 315/169.3 |
| 2010/0025692 A1* | 2/2010 | Hsiao | H01L 29/42384 | 257/72 |
| 2010/0033665 A1* | 2/2010 | Tanaka | G02F 1/1362 | 349/139 |
| 2010/0207846 A1* | 8/2010 | Na | G02F 1/13624 | 345/55 |
| 2011/0037068 A1* | 2/2011 | Yamazaki | H01L 27/1225 | 257/43 |
| 2012/0049190 A1* | 3/2012 | Miyairi | H01L 29/04 | 257/57 |
| 2015/0090980 A1* | 4/2015 | Lee | H01L 27/3262 | 257/40 |
| 2015/0102355 A1* | 4/2015 | Yang | H01L 27/124 | 257/72 |
| 2015/0116622 A1* | 4/2015 | Kim | H01L 27/1296 | 349/43 |
| 2016/0013213 A1* | 1/2016 | Ishizaki | H01L 29/41733 | 257/59 |
| 2016/0202584 A1* | 7/2016 | Liang | G02F 1/136286 | 349/43 |

FOREIGN PATENT DOCUMENTS

| | | | | |
|---|---|---|---|---|
| KR | 1020120013552 | | 2/2012 | |
| KR | 1020140100126 | | 8/2014 | |
| TW | 201626552 | * | 7/2016 | H01L 27/12 |

* cited by examiner

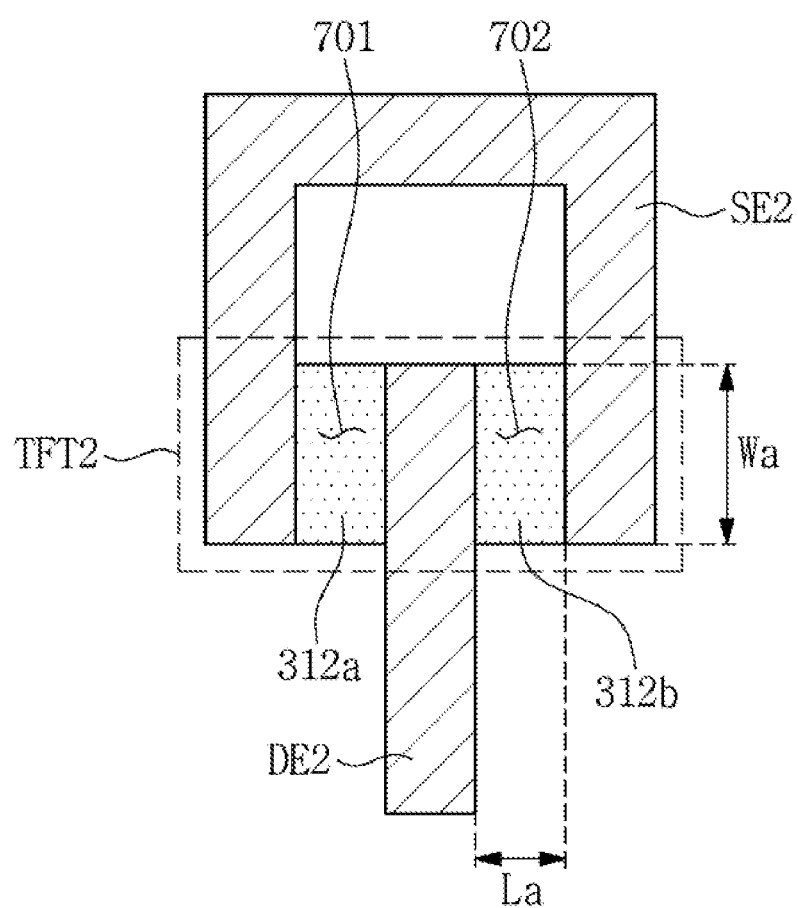

FIG. 11

|  | TFT3 | TFT2' | TFT2 |
|---|---|---|---|
| $W_{min}$ [μm] | 4.89 | 23.39 | 17.40 |
| $W_{max}$ [μm] | 6.10 | 24.43 | 20.04 |
| $\Delta W$ [μm] | 1.21 | 1.04 | 2.64 |
| RATIO | 1.00 | 0.86 | 2.18 |

LIQUID CRYSTAL DISPLAY DEVICE

This application claims priority to Korean Patent Application No. 10-2015-0060623, filed on Apr. 29, 2015, and all the benefits accruing therefrom under 35 U.S.C. §119, the content of which in its entirety is incorporated herein by reference.

BACKGROUND

1. Field

Embodiments of the invention relate to a liquid crystal display ("LCD") device, and more particularly, to an LCD device capable of easily setting up an accurate resistance ratio between thin film transistors.

2. Description of the Related Art

A liquid crystal display ("LCD") device is a type of flat panel display ("FPD") device which has been widely used recently. An LCD device generally includes two substrates having electrodes formed thereon and a liquid crystal layer interposed therebetween.

In such an LCD device, liquid crystal molecules of the liquid crystal layer are rearranged upon voltages being applied to the two electrodes, and thereby an amount of transmitted light is adjusted in the LCD device.

To enhance visibility, a single pixel may include two individual sub-pixel electrodes. In this case, data signals having different values need to be applied to the respective sub-pixel electrodes through a single data line. Therefore, a data signal which is unmodulated may be applied to one of the sub-pixel electrodes, and the data signal may be divided to be applied to the other sub-pixel electrode.

Since the pixel having the above-described structure includes two transistors having different internal resistance levels, a data voltage may be divided by the two transistors.

As a resolution of a display device increases, a size of the transistor may be inevitably reduced. Accordingly, one of the two transistors may have a channel region which allows a size of the transistor to be significantly reduced.

SUMMARY

As one of the two transistors has a channel having a different shape from that of the other transistor as described above, predicting a resistance ratio between the transistors may be difficult. In this regard, the design and manufacture of the transistors may be complicated. In a case in which the transistors are not manufactured based on an accurate resistance ratio, an actual ratio between levels of voltages applied to the two sub-pixel electrodes may be distorted, as compared to the predetermined ratio, thus resulting in the degradation of image quality.

Exemplary embodiments of embodiments of the invention are directed to a liquid crystal display ("LCD") device capable of easily setting up an accurate resistance ratio between transistors.

According to an exemplary embodiment of the invention, an LCD device includes a first substrate comprising a gate line and a data line, a second substrate opposing the first substrate, a liquid crystal layer between the first substrate and the second substrate, a first sub-pixel electrode in a first sub-pixel region of the first substrate, a second sub-pixel electrode in a second sub-pixel region of the first substrate, a first transistor connected to the gate line, the data line, and the first sub-pixel electrode, a second transistor connected to the gate line, the first transistor, and the second sub-pixel electrode, and a third transistor connected to the gate line, the second sub-pixel electrode, and a storage line, wherein one of the first, second, and third transistors includes a plurality of divided channel regions.

In an exemplary embodiment, the number of channel regions of one of the transistors may be "n" times ("n" being a natural number) greater than the number of channel regions of another of the transistors.

In an exemplary embodiment, one of the transistors may be the second transistor, and another of the transistors is the third transistor.

In an exemplary embodiment, one of the transistors may be the second transistor.

In an exemplary embodiment, the first transistor may include a same number of channel regions as a number of channel regions of the third transistor.

In an exemplary embodiment, a source electrode and a drain electrode included in one of the transistors may have a same number of protrusions.

In an exemplary embodiment, a total area of the channel regions included in the second transistor may be greater than an area of the channel region included in the third transistor.

In an exemplary embodiment, one of the channel regions of the second transistor may have a same shape and an area as a shape and an area of the channel region of the third transistor.

In an exemplary embodiment, respective end portions of a source electrode and a drain electrode facing one another of at least one of the first, second, and third transistors may have a curved shape.

In an exemplary embodiment, the end portion of the source electrode and the end portion of the drain electrode may each include a plurality of sides having different lengths.

In an exemplary embodiment, the end portion of the source electrode and the end portion of the drain electrode may each include sides having different lengths at respective corresponding positions.

In an exemplary embodiment, the end portion of the source electrode may have a same length as a length of the end portion of the drain electrode facing one another.

The foregoing is illustrative only and is not intended to be in any way limiting. In addition to the illustrative exemplary embodiments, embodiments, and features described above, further exemplary embodiments, embodiments, and features will become apparent by reference to the drawings and the following detailed description.

BRIEF DESCRIPTION OF THE DRAWINGS

The above and other features and exemplary embodiments of the invention will be more clearly understood from the following detailed description taken in conjunction with the accompanying drawings, in which:

FIGS. 7A and 7B are views illustrating an exemplary embodiment of a structure of a second thin film transistor ("TFT") and a third TFT of FIG. 1;

FIG. 11 is a view illustrating effects of the exemplary embodiment.

DETAILED DESCRIPTION

Figure 1:
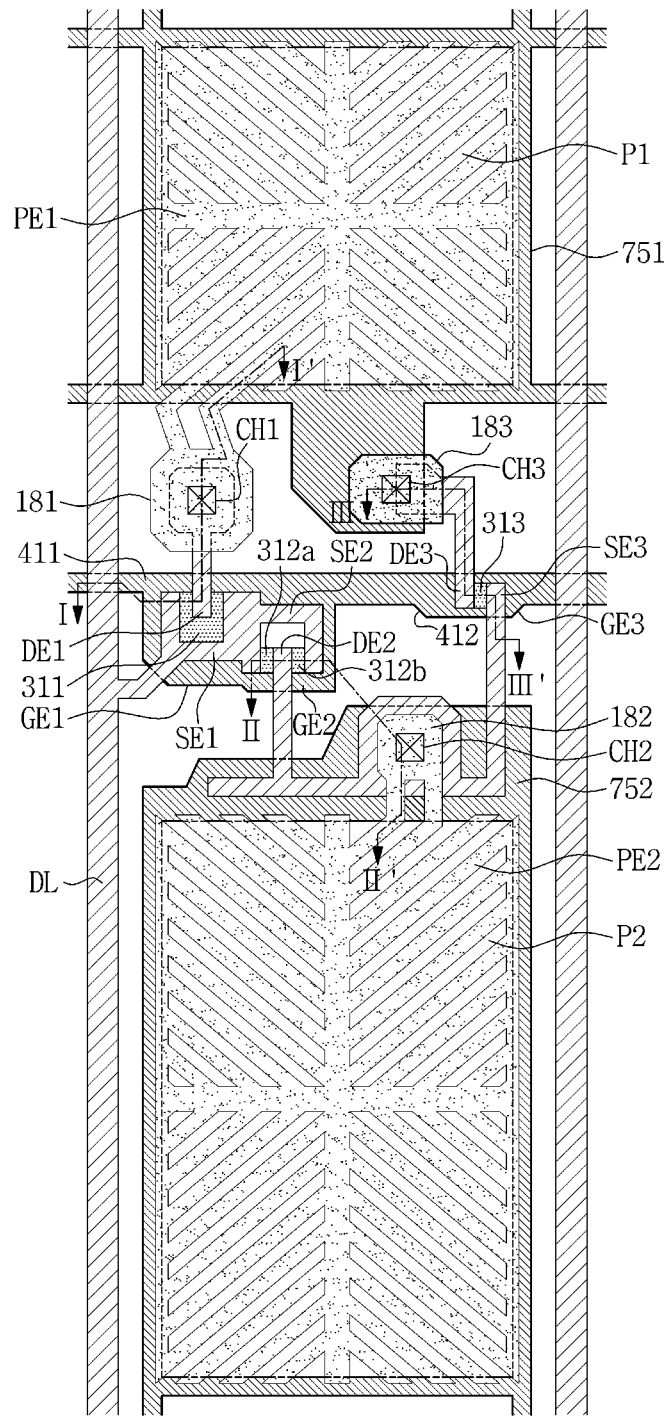
FIG. 1 is a plan view illustrating an exemplary embodiment of a pixel according to the invention.

Advantages and features of the invention and methods for achieving them will be made clear from exemplary embodiments described below in detail with reference to the accompanying drawings. The invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art. The invention is merely defined by the scope of the claims. Therefore, well-known constituent elements, operations and techniques are not described in detail in the exemplary embodiments in order to prevent the invention from being obscurely interpreted. Like reference numerals refer to like elements throughout the specification.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms used herein (including technical and scientific terms) have the same meaning as commonly understood by those skilled in the art. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
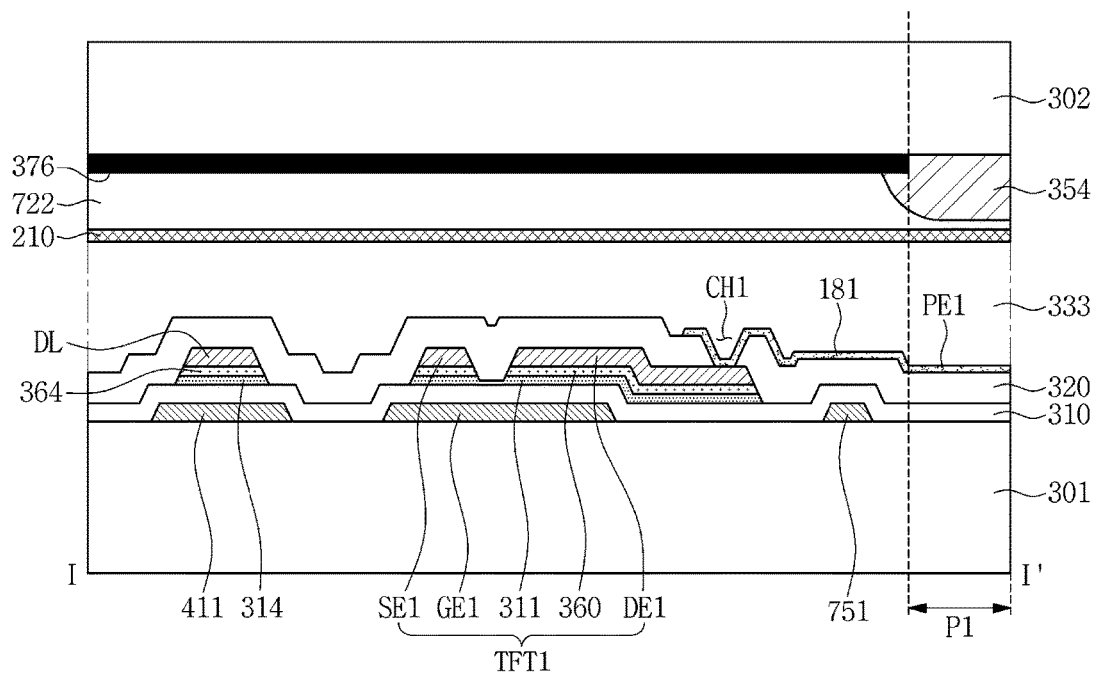
FIG. 2 is a cross-sectional view taken along line I-I' of FIG. 1.
Figure 3:
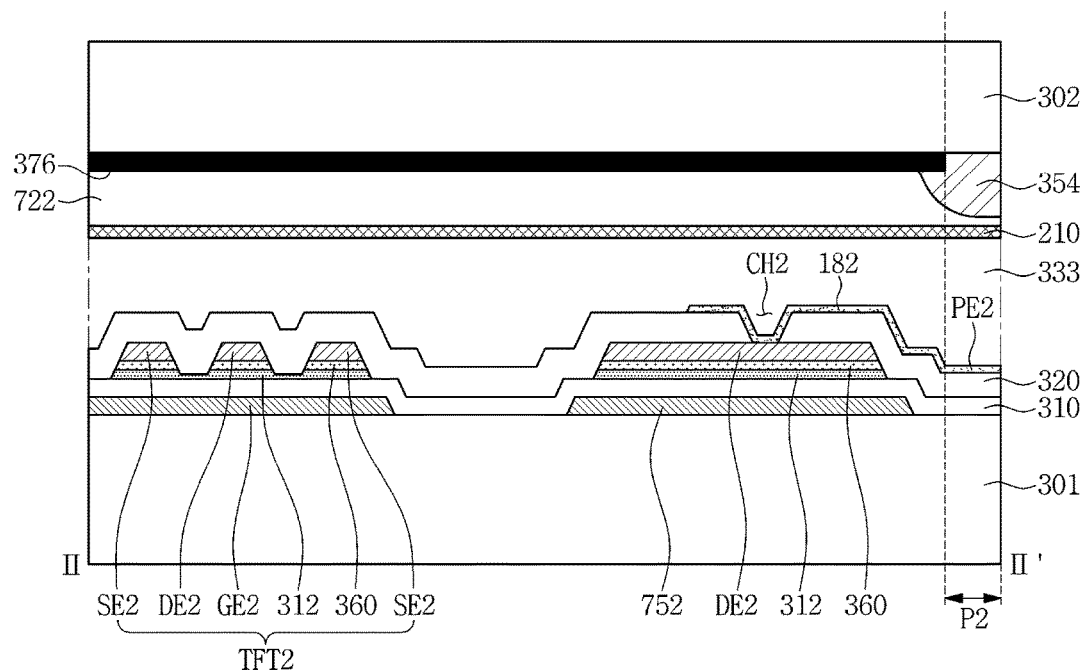
FIG. 3 is a cross-sectional view taken along line II-II' of FIG. 1.
Figure 4:
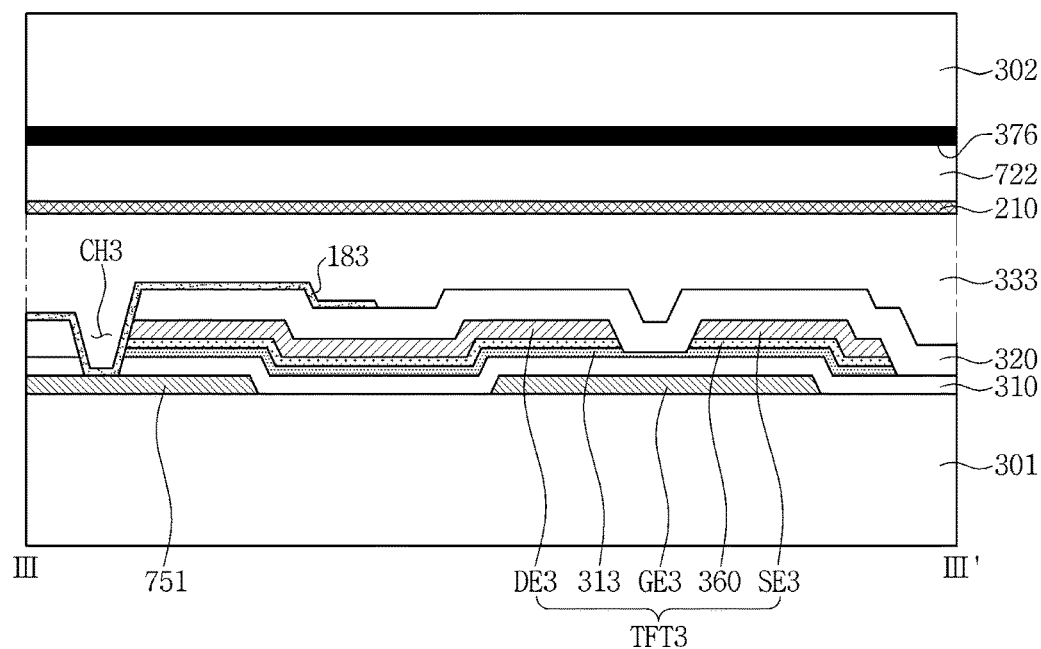
FIG. 4 is a cross-sectional view taken along line III-III' of FIG. 1.

FIG. 1 is a plan view illustrating a pixel according to an exemplary embodiment. FIG. 2 is a cross-sectional view taken along line I-I' of FIG. 1. FIG. 3 is a cross-sectional view taken along line II-II' of FIG. 1. FIG. 4 is a cross-sectional view taken along line III-III' of FIG. 1.

A pixel, as illustrated in FIGS. 1 through 4, may include a first thin film transistor TFT1, a second thin film transistor TFT2, a third thin film transistor TFT3, a first storage line 751, a second storage line 752, a color filter 354, a first sub-pixel electrode PE1, a first extension electrode 181, a second sub-pixel electrode PE2, a second extension electrode 182, a third extension electrode 183, a common electrode 210, and a liquid crystal layer 333.

The first thin film transistor TFT1, as illustrated in FIG. 1, may include a first gate electrode GE1, a first semiconductor layer 311, a first source electrode SE1, and a first drain electrode DE1.

The second thin film transistor TFT2, as illustrated in FIG. 1, may include a second gate electrode GE2, a second semiconductor layer 312, a second source electrode SE2, and a second drain electrode DE2.

The third thin film transistor TFT3, as illustrated in FIG. 1, may include a third gate electrode GE3, a third semiconductor layer 313, a third source electrode SE3, and a third drain electrode DE3.

As illustrated in FIG. 1, a gate line GL may be disposed on a first substrate 301. In detail, the gate line GL may be disposed between a first sub-pixel region P1 and a second sub-pixel region P2 of the first substrate 301.

The gate line GL, as illustrated in FIG. 1, may include a line portion 411 and an electrode portion 412 having different line widths. In an exemplary embodiment, the electrode portion 412 may have a line width wider than that of the line portion 411. The line portion 411 and the electrode portion 412 may be unitary. The electrode portion 412 may include the aforementioned first gate electrode GE1, the second gate electrode GE2, and the third gate electrode GE3.

Although not illustrated, the gate line GL may have a connection portion, for example, an end portion thereof, which is greater than another portion thereof in size, to be connected to another layer or an external driving circuit.

In an exemplary embodiment, the gate line GL may include at least one of an aluminum (Al) based metal such as Al or an Al alloy, a silver (Ag) based metal such as Ag or an Ag alloy, a copper (Cu) based metal such as Cu or an Cu alloy, and a molybdenum (Mo) based metal such as Mo or a Mo alloy. In an alternative exemplary embodiment, the gate line GL may include at least one of chromium (Cr), tantalum (Ta), and titanium (Ti), for example. In an exemplary embodiment, the gate line GL may have a multilayer structure including at least two conductive layers having different physical properties.

The first storage line 751 may be disposed on the first substrate 301. The first storage line 751 may extend along at least one of sides of the first sub-pixel electrode PE1. In an exemplary embodiment, as illustrated in FIG. 1, the first storage line 751 may have a shape enclosing the first sub-pixel electrode PE1, for example. In this instance, the first storage line 751 and the first sub-pixel electrode PE1 may or may not overlap one another. In a case in which the first storage line 751 and the first sub-pixel electrode PE1 overlap one another, a portion of the first storage line 751 and at least one of the sides of the first sub-pixel electrode PE1 may overlap one another.

The first storage line 751 may receive an externally applied first storage voltage. In an exemplary embodiment, the first storage voltage may be a direct current ("DC") voltage, for example.

The first storage line 751 may include the same material and may have the same structure (multilayer structure) as those of the aforementioned gate line GL. In other words, the gate line GL and the first storage line 751 may be simultaneously provided in the same process.

The second storage line 752 may be disposed on the first substrate 301. The second storage line 752 may extend along at least one of sides of the second sub-pixel electrode PE2. In an exemplary embodiment, as illustrated in FIG. 1, the second storage line 752 may be disposed to be adjacent to at least one of the sides of the second sub-pixel electrode PE2, for example. In this instance, the second storage line 752 and the second sub-pixel electrode PE2 may or may not overlap one another. In a case in which the second storage line 752 and the second sub-pixel electrode PE2 overlap one another, a portion of the second storage line 752 and at least one of the sides of the second sub-pixel electrode PE2 may overlap one another.

The second storage line 752 and the first storage line 751 may be connected to one another.

The second storage line 752 may include the same material and may have the same structure (multilayer structure) as those of the aforementioned gate line GL. In other words, the gate line GL and the second storage line 752 may be simultaneously provided in the same process.

A gate insulating layer 310 may be disposed on the gate line GL, the first storage line 751, and the second storage line 752. In this instance, the gate insulating layer 310 may be disposed on an entire surface of the first substrate 301 on which the first storage line 751 and the second storage line 752 are disposed.

As illustrated in FIG. 4, a third contact hole CH3 through which the first storage line 751 is exposed may be defined in the gate insulating layer 310.

In an exemplary embodiment, the gate insulating layer 310 may include silicon nitride ($SiN_x$), silicon oxide ($SiO_x$), or the like, for example. In an exemplary embodiment, the gate insulating layer 310 may have a multilayer structure including at least two insulating layers having different physical properties.

The first, second, and third semiconductor layers 311, 312, and 313 may be disposed on the gate insulating layer 310. In this instance, the first semiconductor layer 311 may overlap the first gate electrode GE1, the second semiconductor layer 312 may overlap the second gate electrode GE2, and the third semiconductor layer 313 may overlap the third gate electrode GE3.

The first, second, and third semiconductor layers 311, 312, and 313 may be connected to one another.

In an exemplary embodiment, the first, second, and third semiconductor layers 311, 312, and 313 may include amorphous silicon, polycrystalline silicon, or the like, for example.

The second semiconductor layer 312 may include a plurality of divided semiconductor layers. In an exemplary embodiment, as illustrated in FIG. 1, the second semiconductor layer 312 may include a first divided semiconductor layer 312a disposed between a portion of the second source electrode SE2 and the second drain electrode DE2, and a second divided semiconductor layer 312b disposed between another portion of the second source electrode SE2 and the second drain electrode DE2, for example.

An ohmic contact layer 360 may be disposed on the first, second, and third semiconductor layers 311, 312, and 313. In this instance, the ohmic contact layer 360 may be disposed between the semiconductor layer and the source electrode and between the semiconductor layer and the drain electrode. In other words, the ohmic contact layer 360 may not be disposed on the semiconductor layer corresponding to each channel region of the first, second, and third thin film transistors TFT1, TFT2, and TFT3. In detail, the ohmic contact layer 360 may be disposed between the first semiconductor layer 311 and the first source electrode SE1, between the first semiconductor layer 311 and the first drain electrode DE1, between the second semiconductor layer 312 and the second source electrode SE2, between the second semiconductor layer 312 and the second drain electrode DE2, between the third semiconductor layer 313 and the third source electrode SE3, and between the third semiconductor layer 313 and the third drain electrode DE3.

In an exemplary embodiment, the ohmic contact layer 360 may include silicide or n+ hydrogenated amorphous silicon doped with high concentration n-type impurities such as phosphorus.

The first source electrode SE1 and the first drain electrode DE1 included in the first thin film transistor TFT1, the second source electrode SE2 and the second drain electrode DE2 included in the second thin film transistor TFT2, and the third source electrode SE3 and the third drain electrode DE3 included in the third thin film transistor TFT3 may be disposed on the ohmic contact layer 360.

The first source electrode SE1, as illustrated in FIG. 1, may extend from the data line DL onto the first gate electrode GE1 to be disposed on the first gate electrode GE1 and the first semiconductor layer 311. The first source electrode SE1 may overlap the first gate electrode GE1 and the first semiconductor layer 311. The first source electrode SE1 may further overlap the line portion 411. In an exemplary embodiment, the first source electrode SE1 may have one of a C shape, an inverted-C shape, a U shape, and an inverted-U shape. By way of example, FIG. 1 illustrates the first source electrode SE1 having a U shape.

In an exemplary embodiment, the first source electrode SE1 may include a refractory metal such as chromium (Cr), tantalum (Ta) and titanium (Ti) or an alloy thereof. In an exemplary embodiment, the first source electrode SE1 may have a multilayer structure including a refractory metal layer and a low-resistance conductive layer. Examples of the multilayer structure may include a double-layer structure including a Cr or Mo (Mo alloy) lower layer and an Al (Al alloy) upper layer, and a triple-layer structure including a Mo (Mo alloy) lower layer, an Al (Al alloy) intermediate layer, and a Mo (Mo alloy) upper layer. Further, the first source electrode SE1 may include various metals or conductive materials other than the aforementioned materials.

The first drain electrode DE1 may be disposed on the first gate electrode GE1 and the first semiconductor layer 311. The first drain electrode DE1 may overlap the first gate electrode GE1, the first semiconductor layer 311, and the first extension electrode 181. In this instance, the first drain electrode DE1 may be connected to the first extension electrode 181 through the first contact hole CH1. The first drain electrode DE1 may further overlap the line portion 411.

The first drain electrode DE1 may include the same material and may have the same structure (multilayer structure) as those of the aforementioned first source electrode SE1. In other words, the first drain electrode DE1 and the first source electrode SE1 may be simultaneously provided in the same process.

The first gate electrode GE1, the first source electrode SE1, the first drain electrode DE1, the first semiconductor layer 311, and the ohmic contact layer 360 may constitute the first thin film transistor TFT1. In this instance, a channel of the first thin film transistor TFT1 may be disposed on a portion of the first semiconductor layer 311 between the first source electrode SE1 and the first drain electrode DE1. In an exemplary embodiment, the portion of the first semiconductor layer 311 corresponding to the channel may have a thickness less than that of another portion of the first semiconductor layer 311.

The second source electrode SE2 may be electrically connected to the first source electrode SE1. To this end, the second source electrode SE2 and the first source electrode SE1 may be unitary. The second source electrode SE2 may be disposed on the second gate electrode GE2 and the second semiconductor layer 312. The second source electrode SE2 may overlap the second gate electrode GE2 and the second semiconductor layer 312. The second source electrode SE2 may further overlap the line portion 411. In an exemplary embodiment, the second source electrode SE2 may have one of a C shape, an inverted-C shape, a U shape, and an inverted-U shape. By way of example, FIG. 1 illustrates the second source electrode SE2 having an inverted-U shape. In other words, the second source electrode SE2 may have an inverted shape with respect to the shape of the first source electrode SE1.

The second source electrode SE2 may include the same material and may have the same structure (multilayer structure) as those of the aforementioned first source electrode SE1. In other words, the second source electrode SE2 and the first source electrode SE1 may be simultaneously provided in the same process.

The second drain electrode DE2 may be disposed on the second gate electrode GE2 and the second semiconductor layer 312. The second drain electrode DE2 may overlap the second gate electrode GE2, the second semiconductor layer 312, and the second extension electrode 182. In this instance, the second drain electrode DE2 may be connected to the second extension electrode 182 through the second contact hole CH2. The second drain electrode DE2 may further overlap the line portion 411.

The second drain electrode DE2 may include the same material and may have the same structure (multilayer structure) as those of the aforementioned first source electrode SE1. In other words, the second drain electrode DE2 and the first source electrode SE1 may be simultaneously provided in the same process.

The second gate electrode GE2, the second source electrode SE2, the second drain electrode DE2, the second semiconductor layer 312, and the ohmic contact layer 360 may constitute the second thin film transistor TFT2. In this instance, a channel of the second thin film transistor TFT2 may be disposed on a portion of the second semiconductor layer 312 between the second source electrode SE2 and the second drain electrode DE2. In an exemplary embodiment, the portion of the second semiconductor layer 312 corresponding to the channel may have a thickness less than that of another portion of the second semiconductor layer 312.

The third source electrode SE3 may be electrically connected to the second drain electrode DE2. To this end, the third source electrode SE3 and the second drain electrode DE2 may be unitary. The third source electrode SE3 may be disposed on the third gate electrode GE3 and the third semiconductor layer 313. The third source electrode SE3 may overlap the third gate electrode GE3, the third semiconductor layer 313, and the second extension electrode 182. The third source electrode SE3 may further overlap the line portion 411.

The third source electrode SE3 may include the same material and may have the same structure (multilayer structure) as those of the aforementioned first source electrode SE1. In other words, the third source electrode SE3 and the first source electrode SE1 may be simultaneously provided in the same process.

The third drain electrode DE3 may be disposed on the third gate electrode GE3, the third semiconductor layer 313 and the first storage line 751. The third drain electrode DE3 may overlap the third gate electrode GE3, the third semiconductor layer 313, the first storage line 751, and the third extension electrode 183. In this instance, the third drain electrode DE3 may be connected to the third extension electrode 183 through the third contact hole CH3. The third drain electrode DE3 may further overlap the line portion 411.

The third drain electrode DE3 may include the same material and may have the same structure (multilayer structure) as those of the aforementioned first source electrode SE1. In other words, the third drain electrode DE3 and the first source electrode SE1 may be simultaneously provided in the same process.

The third gate electrode GE3, the third source electrode SE3, the third drain electrode DE3, the third semiconductor layer 313, and the ohmic contact layer 360 may constitute the third thin film transistor TFT3. In this instance, a channel of the third thin film transistor TFT3 may be disposed on a portion of the third semiconductor layer 313 between the third source electrode SE3 and the third drain electrode DE3. In an exemplary embodiment, the portion of the third semiconductor layer 313 corresponding to the channel may have a thickness less than that of another portion of the third semiconductor layer 313.

The data line DL may be disposed on the gate insulating layer 310. Although not illustrated, the data line DL may have a connection portion, for example, an end portion thereof, which is greater than another portion thereof in size, to be connected to another layer or an external driving circuit.

The data line DL may intersect the gate line GL and the first storage line 751. Although not illustrated, the data line DL may have a narrower line width at a position at which the data line DL and the gate line GL intersect one another than a line width of another portion of the data line DL. Similarly, the data line DL may have a narrower line width at a position at which the data line DL and the first or second storage line 751 or 752 intersect one another than a line width of another portion of the data line DL. Accordingly, a parasitic capacitance between the data line DL and the gate line GL, and a capacitance between the data line DL and the first or second storage line 751 or 752 may decrease. The data line DL may include the same material and may have the same structure (multilayer structure) as those of the aforementioned first source electrode SE1. In other words, the data line DL and the first source electrode SE1 may be simultaneously provided in the same process.

A semiconductor layer 314 and an ohmic contact layer 364 may be disposed below the data line DL, the first, second, and third source electrodes SE1 through SE3, and the first, second, and third drain electrodes DE1, DE2, and DE3. In an exemplary embodiment, as illustrated in FIG. 2, the semiconductor layer 314 and the ohmic contact layer 364 that have substantially the same shape as that of the data line DL may be disposed between the data line DL and the gate insulating layer 310.

A protection layer 320 may be disposed on the data line DL, the first, second, and third source electrodes SE1, SE2, and SE3, and the first, second, and third drain electrodes DE1, DE2, and DE3. In this instance, the protection layer 320 may be disposed on an entire surface of the first substrate 301 which includes the data line DL, the first, second, and third source electrodes SE1, SE2, and SE3, and the first, second, and third drain electrodes DE1, DE2, and DE3. The protection layer 320 may serve to remove a step difference between components disposed between the protection layer 320 and the first substrate 301, such as the aforementioned data line DL, the first, second, and third source electrodes SE1, SE2, and SE3, and the first, second, and third drain electrodes DE1, DE2, and DE3. In addition, the protection layer 320 may serve to protect the components of the first substrate 301.

In an exemplary embodiment, the protection layer 320 may include an inorganic insulating material such as $SiN_x$ or $SiO_x$. In a case that the protection layer 320 includes such an inorganic insulating material, an inorganic insulating material having photosensitivity and a dielectric constant of about 4.0 may be used, for example. In a case in which the protection layer 320 has a double-layer structure including a lower inorganic layer and an upper organic layer, an excellent insulating property of an organic layer may be achieved and damage to an exposed portion of the third semiconductor layer 313 may be significantly reduced. In an exemplary embodiment, the protection layer 320 may have a thickness greater than or equal to about 5000 angstroms (Å), and more particularly, in a range of about 6000 Å to about 8000 Å, for example.

The first, second, and third contact holes CH1, CH2, and CH3 penetrating through a portion of the protection layer 320 may be defined, and portions of the first, second, and third source electrodes SE1, SE2, and SE3 may be exposed through the first, second, and third contact holes CH1, CH2, and CH3, respectively.

The first sub-pixel electrode PE1 may be disposed on the protection layer 320. In detail, the first sub-pixel electrode PE1 may be disposed on the protection layer 320 of the first sub-pixel region P1. A description pertaining to the first sub-pixel electrode PE1 will be provided hereinbelow with reference to FIG. 5.

Figure 5:
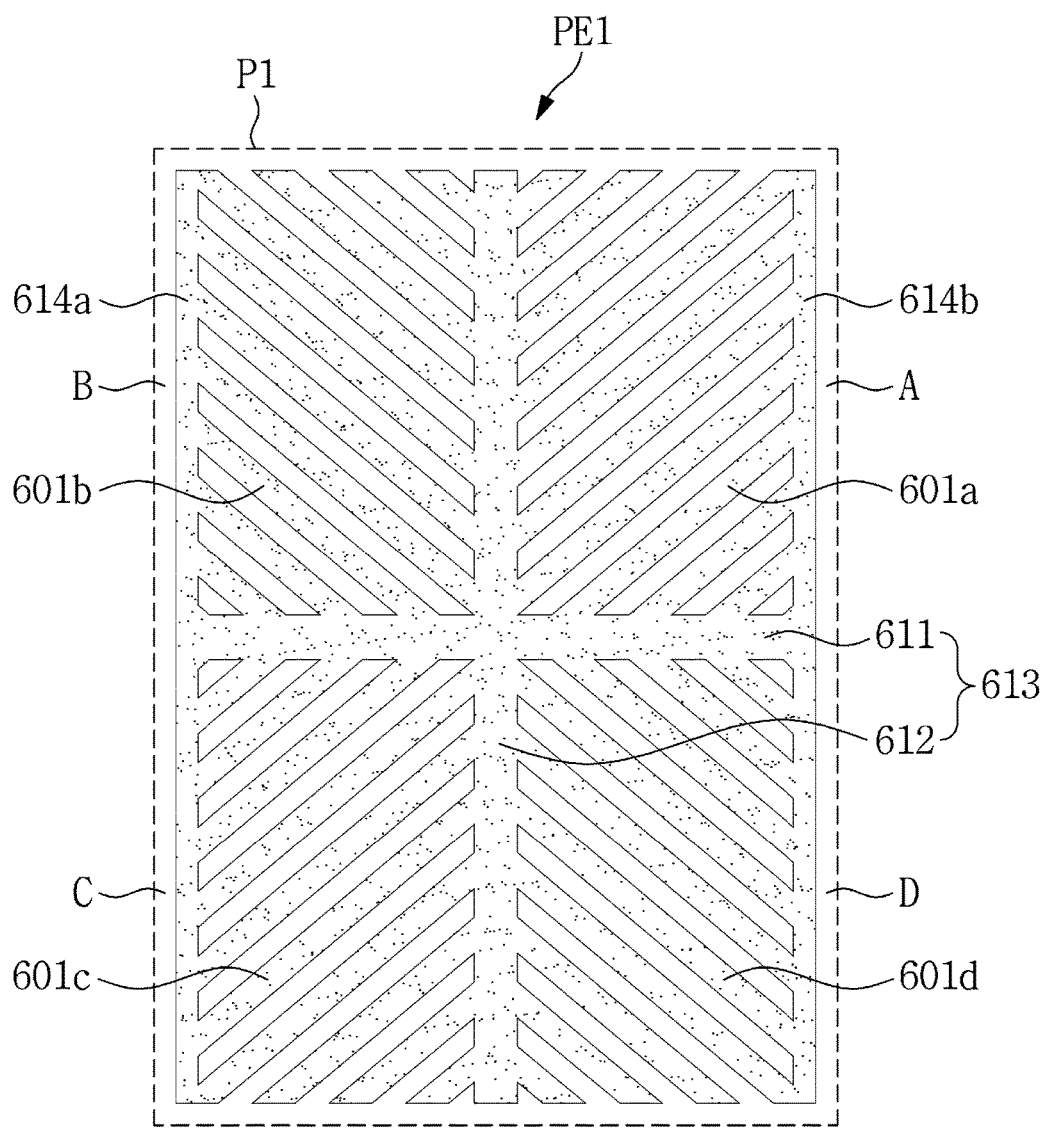
FIG. 5 is a view illustrating a sub-pixel electrode of FIG. 1.

FIG. 5 is a view illustrating the first sub-pixel electrode PE1 of FIG. 1.

The first sub-pixel electrode PE1, as illustrated in FIG. 5, may include a stem electrode 613 and a plurality of branch electrodes 601a, 601b, 601c, and 601d. The stem electrode 613 and the plurality of branch electrodes 601a, 601b, 601c, and 601d may be unitary.

The stem electrode 613 may divide the first sub-pixel region P1 into a plurality of domains. In an exemplary embodiment, the stem electrode 613 may include a horizontal portion 611 and a vertical portion 612 that intersect one another. The horizontal portion 611 may divide the first sub-pixel region P1 into two domains. The vertical portion 612 may divide each of the two divided domains further into two smaller domains. That is, the first sub-pixel region P1 may be divided into four domains A, B, C, and D by the stem electrode 613 including the horizontal portion 611 and the vertical portion 612, for example. However, the invention is not limited thereto, and the first sub-pixel region P1 may include a different number of the domains.

The branch electrodes 601a, 601b, 601c, and 601d may include first, second, third, and fourth branch electrodes 601a, 601b, 601c, and 601d extending from the stem electrode 613 into different directions from one another. In other words, the first, second, third, and fourth branch electrodes 601a, 601b, 601c, and 601d may extend from the stem electrode 613 onto the domains A, B, C, and D, respectively. In an exemplary embodiment, the first branch electrode 601a may be disposed in the first domain A, the second branch electrode 601b may be disposed in the second domain B, the third branch electrode 601c may be disposed in the third domain C, and the fourth branch electrode 601d may be disposed in the fourth domain D, for example.

The first branch electrode 601a and the second branch electrode 601b may be symmetrical to one another with reference to the vertical portion 612, and the third branch electrode 601c and the fourth branch electrode 601d may be symmetrical to one another with reference to the vertical portion 612. In addition, the first branch electrode 601a and the fourth branch electrode 601d may be symmetrical to one another with reference to the horizontal portion 611, and the second branch electrode 601b and the third branch electrode 601c may be symmetrical to one another with reference to the horizontal portion 611.

As the first domain A may include a plurality of first branch electrodes 601a, the plurality of first branch electrodes 601a may be arranged in parallel to one another. In this instance, at least one of the first branch electrodes 601a may extend from a side of a horizontal portion 611 in the first domain A in a diagonal direction with respect to the side of the horizontal portion 611. The remainder of the first branch electrodes 601a may extend from a side of the vertical portion 612 in the first domain A in a diagonal direction with respect to the side of the vertical portion 612.

As the second domain B may include a plurality of second branch electrodes 601b, the plurality of second branch electrodes 601b may be arranged in parallel to one another. In this instance, at least one of the second branch electrodes 601b may extend from a side of the horizontal portion 611 in the second domain B in a diagonal direction with respect to the side of the horizontal portion 611. The remainder of the second branch electrodes 601b may extend from a side of the vertical portion 612 in the second domain B in a diagonal direction with respect to the side of the vertical portion 612.

As the third domain C may include a plurality of third branch electrodes 601c, the plurality of third branch electrodes 601c may be arranged in parallel to one another. In this instance, at least one of the third branch electrodes 601c may extend from a side of the horizontal portion 611 in the third domain C in a diagonal direction with respect to the side of the horizontal portion 611. The remainder of the third branch electrodes 601c may extend from a side of the vertical portion 612 in the third domain C in a diagonal direction with respect to the side of the vertical portion 612.

As the fourth domain D may include a plurality of fourth branch electrodes 601d, the plurality of fourth branch electrodes 601d may be arranged in parallel to one another. In this instance, at least one of the fourth branch electrodes 601d may extend from a side of the horizontal portion 611 in the fourth domain D in a diagonal direction with respect to the side of the horizontal portion 611. The remainder of the fourth branch electrodes 601d may extend from a side of the vertical portion 612 in the fourth domain D in a diagonal direction with respect to the side of the vertical portion 612.

The aforementioned stem electrode 613 may further include a first connector 614a and a second connector 614b.

The first connector 614a may be connected to one end of the horizontal portion 611, and the second connector 614b may be connected to the other end of the horizontal portion 611. The first connector 614a and the second connector 614b may be aligned in parallel to the vertical portion 612. The first connector 614a and the second connector 614b may be integrally provided with the stem electrode 613.

An end portion of at least one of the first branch electrodes 601a in the first domain A and an end portion of at least one of the fourth branch electrodes 601d in the fourth domain D may be connected to one another by the second connector 614b. Similarly, an end portion of at least one of the second branch electrodes 601b in the second domain B and an end portion of at least one of the third branch electrodes 601c in the third domain C may be connected to one another by the first connector 614a.

The second sub-pixel electrode PE2 may be disposed on the protection layer 320. In detail, the second sub-pixel electrode PE2 may be disposed on the protection layer 320 of the second sub-pixel region P2.

The second sub-pixel electrode PE2 may have substantially the same structure as that of the first sub-pixel electrode PE1. In other words, the second sub-pixel electrode PE2 may include a stem electrode by which the second sub-pixel region P2 is divided into a plurality of domains, and a plurality of branch electrodes extending from the stem electrode onto the respective domains. In addition, the second sub-pixel electrode PE2 may further include a first connector and a second connector. Since the stem electrode, the branch electrode, the first connector, and the second connector included in the second sub-pixel electrode PE2 are the same as those included in the aforementioned first sub-pixel electrode PE1, reference may be made to analogous features described in FIG. 5.

The third extension electrode 183 may be disposed on the protection layer 320. The third extension electrode 183 may overlap the first storage line 751 and the third drain electrode DE3. The third extension electrode 183 may be connected to the first storage line 751 and the third drain electrode DE3 through the third contact hole CH3.

The third extension electrode 183 may include the same material forming the aforementioned first sub-pixel electrode PE1.

Although not illustrated, a display device according to the illustrated exemplary embodiment may further include a protection line. The protection line may be disposed on the protection layer 320. In detail, the protection line may be disposed on a portion of the protection layer 320 on the data line DL. In other words, the protection line may overlap the data line DL. In an exemplary embodiment, the protection line may have a line width wider than that of the data line DL.

In an exemplary embodiment, the protection line may include the same material forming the aforementioned first sub-pixel electrode PE1. In this instance, the protection line may be connected to the third extension electrode 183. In other words, the protection line and the third extension electrode 183 may be unitary.

A common voltage may be applied to the protection line. According to exemplary embodiments, a voltage having a level lower than or equal to that of the common voltage may be applied to the protection line.

Although not illustrated, a lower alignment layer may be disposed on the first sub-pixel electrode PE1, the first extension electrode 181, the second sub-pixel electrode PE2, the second extension electrode 182, the protection line, the third extension electrode 183, and the protection layer 320.

In an exemplary embodiment, the lower alignment layer may be a homeotropic alignment layer or may include a photo-reactive material.

A black matrix 376 may be disposed on the second substrate 302. In detail, the black matrix 376 may be disposed on a portion of the second substrate 302 aside from a portion thereof corresponding to a pixel region P including the first sub-pixel region P1 and the second sub-pixel region P2. In an alternative exemplary embodiment, the black matrix 376 may be disposed on the first substrate 301 rather than the second substrate 302.

The color filter 354 may be disposed in the pixel region P. In an exemplary embodiment, the color filter 354 may include a red color filter, a green color filter, and a blue color filter, for example. In an alternative exemplary embodiment, the color filter 354 may be disposed on the first substrate 301 rather than the second substrate 302.

An overcoat layer 722 may be disposed on the black matrix 376 and the color filter 354. In this instance, the overcoat layer 722 may be disposed on an entire surface of the second substrate 302 which includes the black matrix 376 and the color filter 354.

The overcoat layer 722 may serve to remove a step difference between components disposed between the overcoat layer 722 and the second substrate 302, such as the aforementioned black matrix 376 and the color filter 354. In addition, the overcoat layer 722 may serve to prevent external leakage of a dye forming the color filter 354.

A common electrode 210 may be disposed on the overcoat layer 722. In this instance, the common electrode 210 may be disposed on an entire surface of the first substrate 301 which includes the overcoat layer 722. In an alternative exemplary embodiment, the common electrode 210 may be disposed on the overcoat layer 722 corresponding to the first sub-pixel region P1 and the second sub-pixel region P2.

A common voltage may be applied to the common electrode 210. In an exemplary embodiment, the aforementioned first storage voltage and the second storage voltage may have the same level as that of the common voltage. In an alternative exemplary embodiment, the first storage voltage, the second storage voltage, and the common voltage may have different levels.

In an exemplary embodiment, the common electrode 210 may include the same material forming the aforementioned first sub-pixel electrode PE'.

Although not illustrated, an upper alignment layer may be disposed on the common electrode 210 and the overcoat layer 722. In an exemplary embodiment, the upper alignment layer may be a homeotropic alignment layer and may be an alignment layer which is photo-aligned using a photo-polymerization material, for example.

A liquid crystal layer 333 may be interposed between the first and second substrates 301 and 302. In an exemplary embodiment, the liquid crystal layer 333 may include a photopolymerization material, and such a photopolymerization material may be a reactive monomer or a reactive mesogen.

When surfaces of the first substrate 301 and the second substrate 302 that face one another are defined as upper surfaces of the corresponding substrates, respectively, and surfaces of the first substrate 301 and the second substrate 302 opposite to the upper surfaces thereof are defined as lower surfaces of the corresponding substrates, respectively, an upper polarizer may further be disposed on the lower surface of the first substrate 301, and a lower polarizer may further be disposed on the lower surface of the second substrate 302.

A transmission axis of the upper polarizer may be perpendicular to a transmission axis of the lower polarizer, and thus one of the transmission axes and the line portion 411 of the gate line GL may be aligned in parallel to one another. In an exemplary embodiment, the display device may only include one of the upper polarizer and the lower polarizer.

Figure 6:
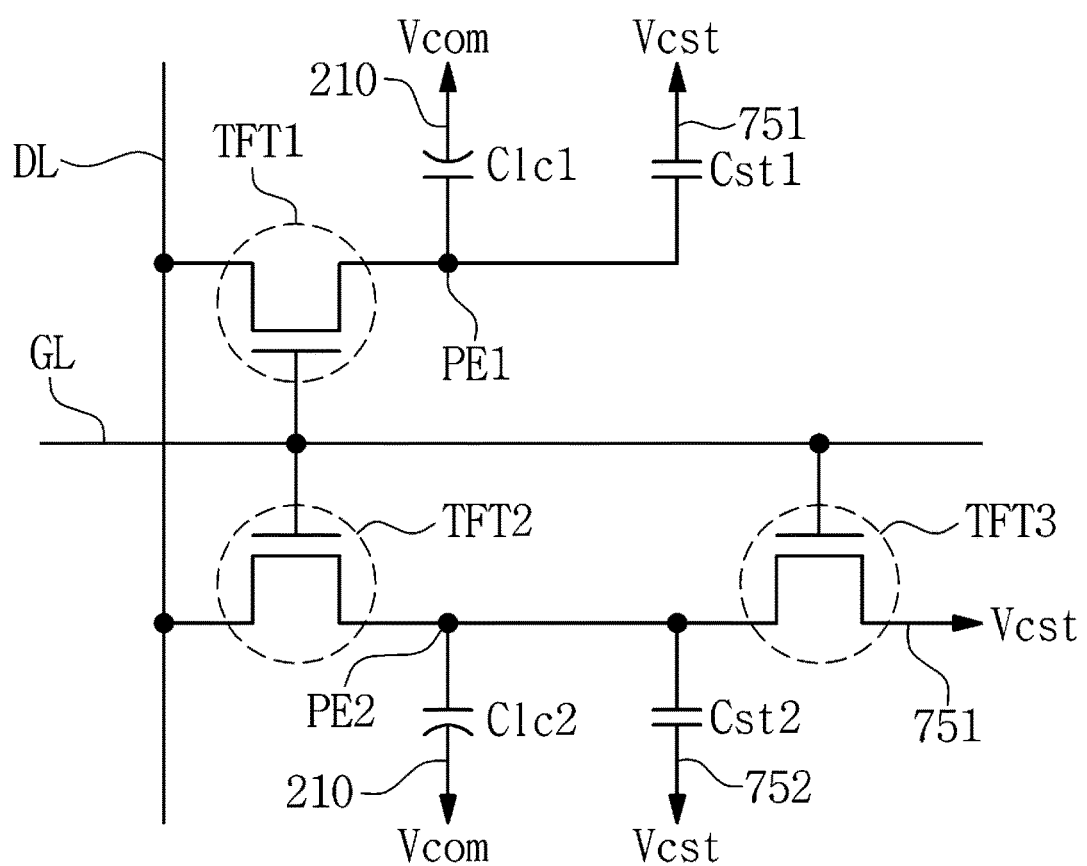
FIG. 6 is an equivalent circuit schematic of the pixel illustrated in FIG. 1.

FIG. 6 is an equivalent circuit schematic of the pixel illustrated in FIG. 1.

The pixel, as illustrated in FIG. 6, may include the first thin film transistor TFT1, a first liquid crystal capacitor Clc1, a first storage capacitor Cst1, the second thin film transistor TFT2, a second liquid crystal capacitor Clc2, a second storage capacitor Cst2, and the third thin film transistor TFT3.

The first thin film transistor TFT1 may be controlled based on a gate signal from the gate line GL, and may be connected between the data line DL and the first sub-pixel electrode PE1. The first thin film transistor TFT1 may be turned on by a gate high voltage of the gate signal to thereby apply a data signal from the data line DL to the first sub-pixel electrode PE1.

The first liquid crystal capacitor Clc1 may be connected between the first sub-pixel electrode PE1 and the common electrode 210 opposing one another. As described above, a common voltage Vcom may be applied to the common electrode 210.

The first storage capacitor Cst1 may be connected between the first sub-pixel electrode PE1 and the first storage line 751 opposing one another. A storage voltage Vsct may be applied to the first storage line 751. In an exemplary embodiment, the storage voltage Vsct may have the same level as that of the common voltage Vcom.

The second thin film transistor TFT2 may be controlled based on a gate signal from the gate line GL, and may be connected between the data line DL and the second sub-pixel electrode PE2. The second thin film transistor TFT2 may be turned on by a gate high voltage of the gate signal to thereby apply a data signal from the data line DL to the second sub-pixel electrode PE2.

The second liquid crystal capacitor Clc2 may be connected between the second sub-pixel electrode PE2 and the common electrode 210 opposing one another.

The second storage capacitor Cst2 may be connected between the second sub-pixel electrode PE2 and the second storage line 752 opposing one another. A storage voltage Vsct may be applied to the second storage line 752. In an exemplary embodiment, the storage voltage Vsct may have the same level as that of the common voltage Vcom.

The third thin film transistor TFT3 may be controlled based on a gate signal from the gate line GL, and may be connected between the second sub-pixel electrode PE2 and the first storage line 751. The third thin film transistor TFT3 may be turned on by a gate high voltage of the gate signal to thereby apply a data signal from the second sub-pixel electrode PE2 to the first storage line 751.

The pixel illustrated in FIG. 6 may operate as follows.

When a gate signal is applied to the gate line GL, data voltages transmitted to the data line DL may be applied to the first sub-pixel electrode PE1 and the second sub-pixel electrode PE2 through the first thin film transistor TFT1 and the second thin film transistor TFT2, respectively.

The data voltage transmitted through the first thin film transistor TFT1 may be totally applied to the first sub-pixel electrode PE1 whereas only a portion of the data voltage transmitted through the second thin film transistor TFT2 may be applied to the second sub-pixel electrode PE2 due to the third thin film transistor TFT3. Accordingly, a luminance of the first sub-pixel region P1 in which the first sub-pixel electrode PE1 is disposed may be higher than a luminance of the second sub-pixel region P2 in which the second sub-pixel electrode PE2 is disposed.

In detail, when a gate signal is applied to the gate line GL, a data voltage applied to the second source electrode SE2 of the second thin film transistor TFT2 may pass through a channel to be transmitted to the second drain electrode DE2 of the second thin film transistor TFT2. A portion of the data voltage transmitted to the second drain electrode DE2 of the second thin film transistor TFT2 may be applied to the second sub-pixel electrode PE2, and another portion of the data voltage may be discharged to the first storage line 751 through the third thin film transistor TFT3.

Since the data voltage is divided based on a resistance ratio between the second thin film transistor TFT2 and the third thin film transistor TFT3, when properties of the second thin film transistor TFT2 and the third thin film transistor TFT3 satisfy a condition of Equation 1 provided below, a ratio (voltage ratio) between the data voltage applied to the first sub-pixel electrode PE1 and the data voltage applied to the second sub-pixel electrode PE2 may hardly vary. In other words, a range of the variation in the voltage ratio may be significantly reduced. Hereinafter, the range of the variation in the voltage ratio will be referred to as a "voltage ratio distribution range".

$$W\_TFT3/W\_TFT2 = \Delta W\_TFT3/\Delta W\_TFT2 \quad \text{[Equation 1]}$$

In Equation 1, W_TFT3 denotes a channel width of the third thin film transistor TFT3, W_TFT2 denotes a channel width of the second thin film transistor TFT2, ΔW_TFT3 denotes a channel width variation of the third thin film transistor TFT3, and ΔW_TFT2 denotes a channel width variation of the second thin film transistor TFT2. As used herein, the channel width may refer to an effective channel width.

According to Equation 1, when a ratio between the channel width W_TFT3 of the third thin film transistor TFT3 and the channel width W_TFT2 of the second thin film transistor TFT2 is the same as a ratio between the channel width variation ΔW_TFT3 of the third thin film transistor TFT3 and the channel width variation ΔW_TFT2 of the second thin film transistor TFT2, the voltage ratio distribution range may be significantly reduced.

To significantly reduce the voltage ratio distribution range, the second thin film transistor TFT2 and the third thin film transistor TFT3 may have a relationship as will be described hereinbelow with reference to FIGS. 7 through 10.

FIG. 7 is a view illustrating an example of a structure of the second thin film transistor TFT2 and the third thin film transistor TFT3 of FIG. 1.

As illustrated in FIG. 7A, the second thin film transistor TFT2 may include a plurality of divided channel regions. In an exemplary embodiment, the plurality of divided channel regions may include a first channel region 701 and a second channel region 702 that are divided from one another, for example.

A second source electrode SE2 of the second thin film transistor TFT2 may include two protrusions. A second drain electrode DE2 may be disposed between the two protrusions.

The first channel region 701 and the second channel region 702 of the second thin film transistor TFT2 may be defined by the second source electrode SE2 and the second drain electrode DE2. In detail, the first channel region 701 may correspond to a first divided semiconductor layer 312a between one of the protrusions of the second source electrode SE2 and the second drain electrode DE2, and the second channel region 702 may correspond to a second divided semiconductor layer 312b between the other of the protrusions of the second source electrode SE2 and the second drain electrode DE2.

Respective end portions of the second source electrode SE2 and the second drain electrode DE2 facing one another may have a linear shape.

Figure 7B:
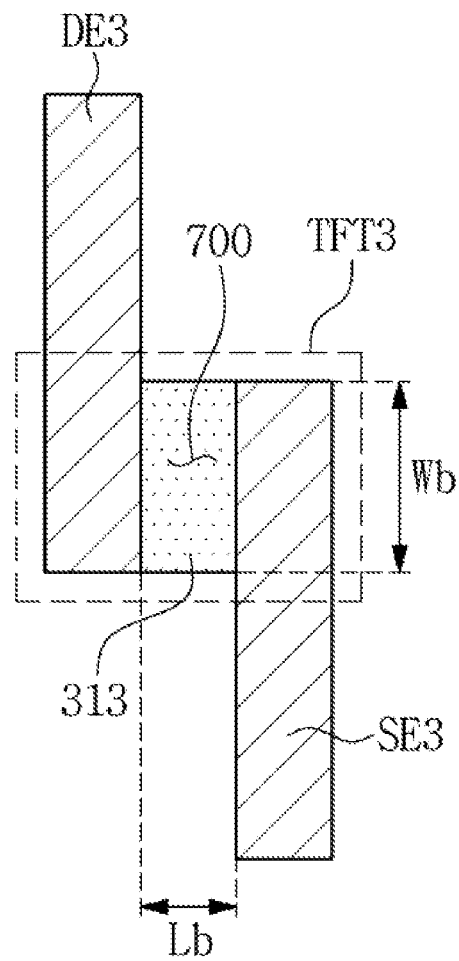

As illustrated in FIG. 7B, the third thin film transistor TFT3 may include a single channel region 700.

The channel region 700 of the third thin film transistor TFT3 may be defined by a third source electrode SE3 and a third drain electrode DE3. In detail, the channel region 700 may correspond to a third semiconductor layer 313 between the third source electrode SE3 and the third drain electrode DE3.

Respective end portions of the third source electrode SE3 and the third drain electrode DE3 facing one another may have a linear shape. A length of the end portions may be the same.

The second thin film transistor TFT2 may have a greater channel region than that of the third thin film transistor TFT3. In other words, a total area of the channel region included in the second thin film transistor TFT2 may be greater than that included in the third thin film transistor TFT3. In an exemplary embodiment, as illustrated in FIGS. 7A and 7B, a total area calculated by a sum of an area of the first channel region 701 of the second thin film transistor TFT2 and an area of the second channel region 702 of the second thin film transistor TFT2 may be greater than an area of the channel region 700 of the third thin film transistor TFT3, for example.

The second thin film transistor TFT2 may include a channel region having the same shape and area as a channel region of the third thin film transistor TFT3. In other words, one of the channel regions included in the second thin film transistor TFT2 and one of the channel regions included in the third thin film transistor TFT3 may have the same shape and area. In an exemplary embodiment, as illustrated in FIGS. 7A and 7B, the first channel region 701 of the second thin film transistor TFT2 may have the same shape and area as that of the channel region 700 of the third thin film transistor TFT3, for example. Also, the second channel region 702 of the second thin film transistor TFT2 may have the same shape and area as those of the channel region 700 of the third thin film transistor TFT3. In other words, when the second thin film transistor TFT2 includes a plurality of divided channel regions, the channel regions of the second thin film transistor TFT2 may each have the same shape and area as those of the channel region 700 of the third thin film transistor TFT3. In particular, a channel width Wa of the first channel region 701 included in the second thin film transistor TFT2 and a channel width Wb of the channel region 700 included in the third thin film transistor TFT3 may be the same, and a channel length La of the first channel region 701 included in the second thin film transistor TFT2 and a channel length Lb of the channel region 700 included in the third thin film transistor TFT3 may be the same. Similarly, a channel width Wa of the second channel region 702 included in the second thin film transistor TFT2 and the channel width Wb of the channel region 700 included in the third thin film transistor TFT3 may be the same, and a channel length La of the second channel region 702 included in the second thin film transistor TFT2 and the channel length Lb of the channel region 700 included in the third thin film transistor TFT3 may be the same.

As the plurality of channel regions included in the second thin film transistor TFT2 each have the same shape and area as those of the channel region 700 included in the third thin film transistor TFT3, a ratio between the channel width of the third thin film transistor TFT3 and the channel width of the second thin film transistor TFT2 may be substantially the same as a ratio between the channel width variation of the third thin film transistor TFT3 and the channel width variation of the second thin film transistor TFT2. Accordingly, the voltage ratio distribution range may be significantly reduced.

In FIGS. 7A and 7B, a ratio between a total channel width of the second thin film transistor TFT2 and a total channel width of the third thin film transistor TFT3 may be 2:1, for example.

Figure 8A:
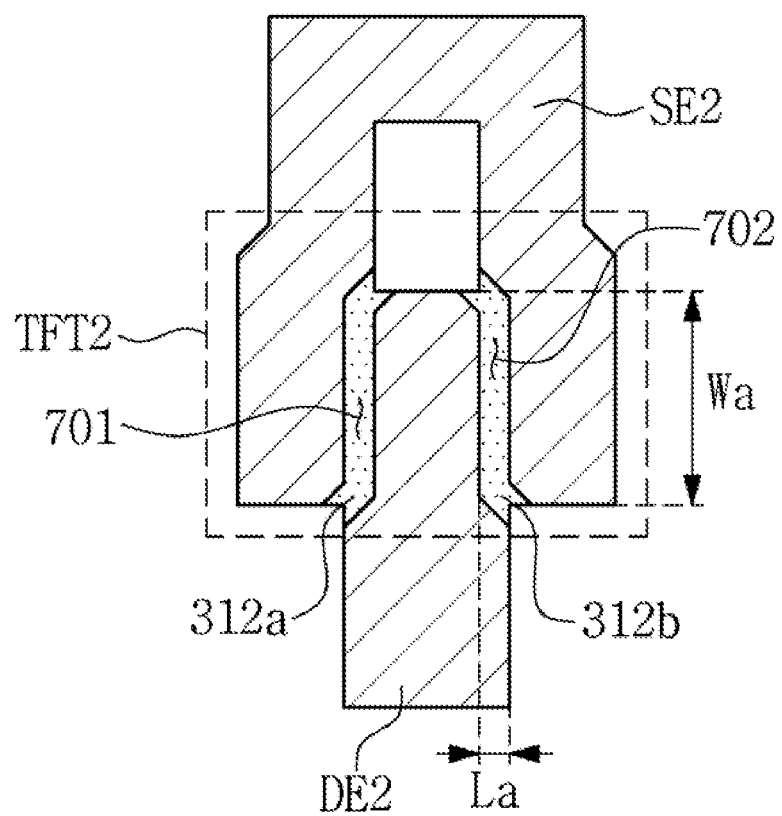
FIGS. 8A and 8B are views illustrating another exemplary embodiment of the structure of the second TFT and the third TFT of FIG. 1.
Figure 8B:
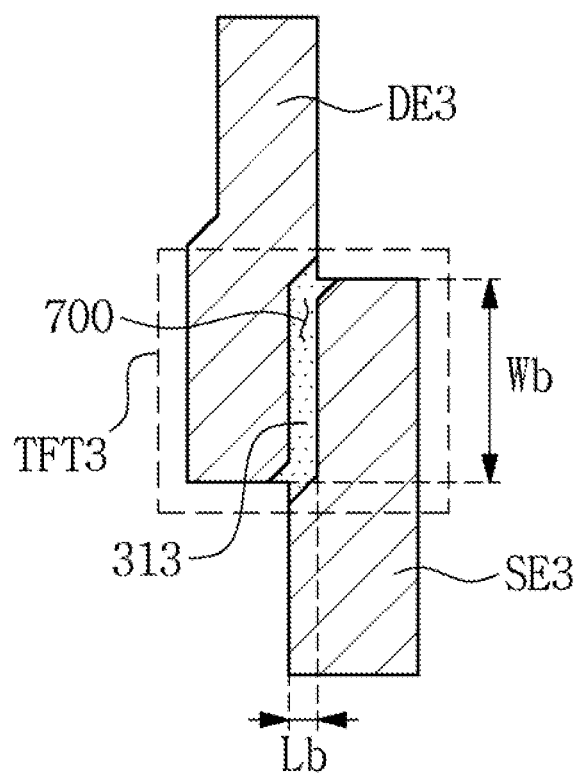

FIGS. 8A and 8B are views illustrating another example of the structure of the second thin film transistor TFT2 and the third thin film transistor TFT3 of FIG. 1.

As illustrated in FIG. 8A, the second thin film transistor TFT2 may include a plurality of divided channel regions. In an exemplary embodiment, the plurality of channel regions may include a first channel region 701 and a second channel region 702 that are divided from one another, for example.

A second source electrode SE2 of the second thin film transistor TFT2 may include two protrusions. A second drain electrode DE2 may be disposed between the two protrusions.

The first channel region 701 and the second channel region 702 of the second thin film transistor TFT2 may be defined by the second source electrode SE2 and the second drain electrode DE2. In detail, the first channel region 701 may correspond to a first divided semiconductor layer 312a between one of the protrusions of the second source electrode SE2 and the second drain electrode DE2, and the second channel region 702 may correspond to a second divided semiconductor layer 312b between the other of the protrusions of the second source electrode SE2 and the second drain electrode DE2.

Respective end portions of the second source electrode SE2 and the second drain electrode DE2 facing one another may have a curved shape. A length of the end portions may be the same. In addition, the end portion of the second source electrode SE2 and the end portion of the second drain electrode DE2 may each include a plurality of sides having different lengths. In this instance, a side included in the end portion of the second source electrode SE2 and a side included in the end portion of the second drain electrode DE2 may be disposed to correspond to one another and may have different lengths. In an exemplary embodiment, as illustrated in FIG. 8A, in the second source electrode SE2 and the second drain electrode DE2 defining the first channel region 701, the end portion of the second source electrode SE2 and the end portion of the second drain electrode DE2 facing one another may each include three sides having different lengths and facing different directions, for example. In this instance, a short diagonal side included in the end portion of the second source electrode SE2 may face a long diagonal side included in the end portion of the second drain electrode DE2, a vertical side included in the end portion of the second source electrode SE2 may face a vertical side included in the end portion of the second drain electrode DE2, and a long diagonal side included in the end portion of the second source electrode SE2 may face a short diagonal side included in the end portion of the second drain electrode DE2.

As illustrated in FIG. 8B, the third thin film transistor TFT3 may include a single channel region 700.

The channel region 700 of the third thin film transistor TFT3 may be defined by a third source electrode SE3 and a third drain electrode DE3. In detail, the channel region 700 may correspond to a third semiconductor layer 313 between the third source electrode SE3 and the third drain electrode DE3.

Respective end portions of the third source electrode SE3 and the third drain electrode DE3 facing one another may have a curved shape. In this instance, a length of the end portions may be the same. In addition, the end portion of the third source electrode SE3 and the end portion of the third drain electrode DE3 may each include a plurality of sides having different lengths. In this instance, a side included in the end portion of the third source electrode SE3 and a side included in the end portion of the third drain electrode DE3 may be disposed to correspond to one another and may have different lengths. In an exemplary embodiment, as illustrated in FIG. 8B, in the third source electrode SE3 and the third drain electrode DE3 defining the channel region 700, the end portion of the third source electrode SE3 and the end portion of the third drain electrode DE3 facing one another may each include three sides having different lengths and facing different directions, for example. In this instance, a short diagonal side included in the end portion of the third source electrode SE3 may face a long diagonal side included in the end portion of the third drain electrode DE3, a vertical side included in the end portion of the third source electrode SE3 may face a vertical side included in the end portion of the third drain electrode DE3, and a long diagonal side included in the end portion of the third source electrode SE3 may face a short diagonal side included in the end portion of the third drain electrode DE3.

The second thin film transistor TFT2 and the third thin film transistor TFT3 illustrated in FIGS. 8A and 8B may have substantially the same structure as that of the second thin film transistor TFT2 and the third thin film transistor TFT3 described with reference to FIGS. 7A and 7B. In other words, as illustrated in FIGS. 8A and 8B, the plurality of channel regions included in the second thin film transistor TFT2 may each have the same shape and area as those of the channel region included in the third thin film transistor TFT3. In an exemplary embodiment, a channel width Wa of the first channel region 701 included in the second thin film transistor TFT2 and a channel width Wb of the channel region 700 included in the third thin film transistor TFT3 may be the same, and a channel length La of the first channel region 701 included in the second thin film transistor TFT2 and a channel length Lb of the channel region 700 included in the third thin film transistor TFT3 may be the same, for example. Similarly, a channel width Wa of the second channel region 702 included in the second thin film transistor TFT2 and the channel width Wb of the channel region 700 included in the third thin film transistor TFT3 may be the same, and a channel length La of the second channel region 702 included in the second thin film transistor TFT2 and the channel length Lb of the channel region 700 included in the third thin film transistor TFT3 may be the same.

In FIGS. 8A and 8B, a ratio between a total channel width of the second thin film transistor TFT2 and a total channel width of the third thin film transistor TFT3 may be 2:1.

Figure 9A:
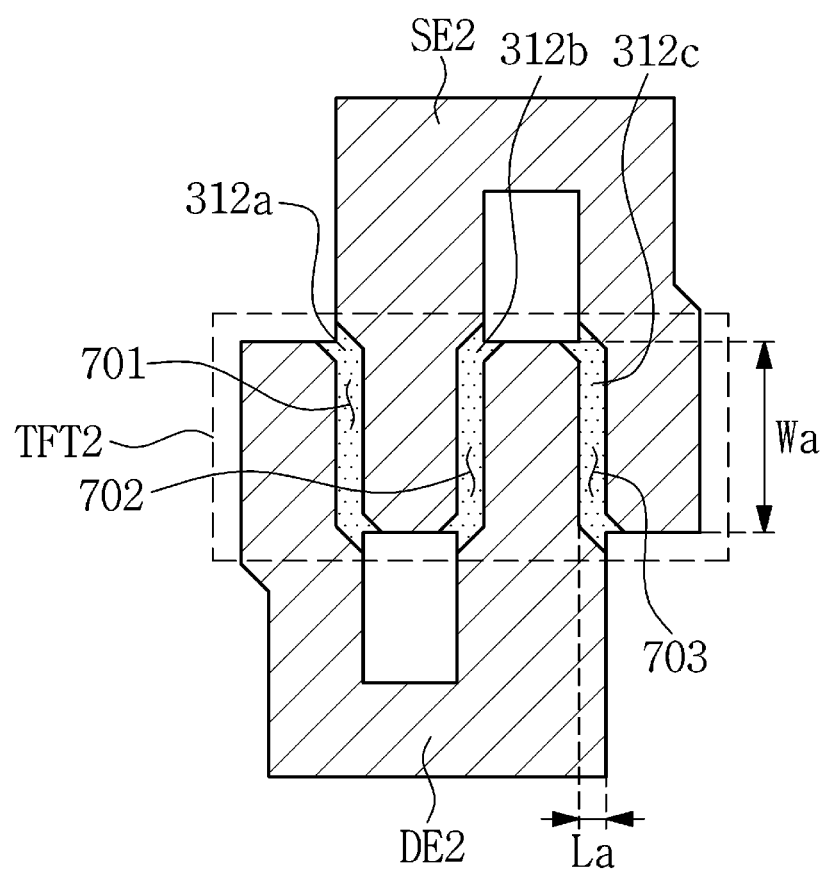
FIGS. 9A and 9B are views illustrating still another exemplary embodiment of the structure of the second TFT and the third TFT of FIG. 1.
Figure 9B:
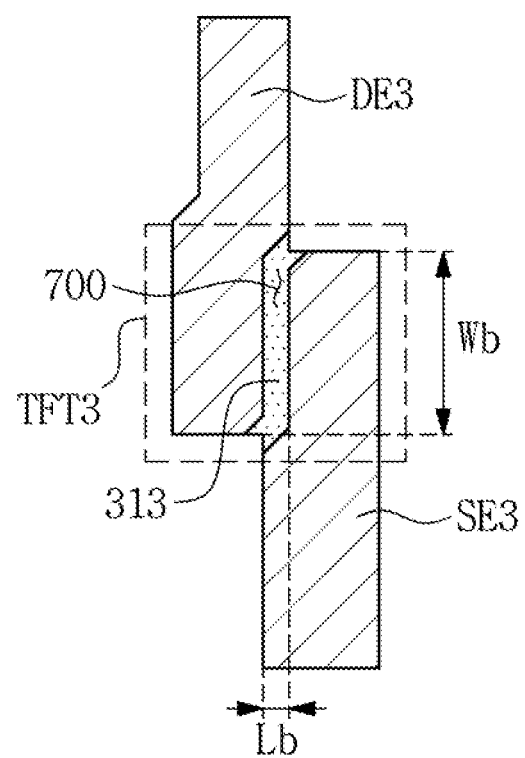

FIGS. 9A and 9B are views illustrating still another example of the structure of the second thin film transistor TFT2 and the third thin film transistor TFT3 of FIG. 1.

As illustrated in FIG. 9A, the second thin film transistor TFT2 may include a plurality of spaced-apart channel regions. In an exemplary embodiment, the plurality of channel regions may include a first channel region 701, a second channel region 702, and a third channel region 703 that are divided from one another, for example.

A second source electrode SE2 of the second thin film transistor TFT2 may include two protrusions. A second drain electrode DE2 of the second thin film transistor TFT2 may include two protrusions. One of the protrusions of the second source electrode SE2 may be disposed between the two protrusions of the second drain electrode DE2. One of the protrusions of the second drain electrode DE2 may be disposed between the two protrusions of the second source electrode SE2.

The first channel region 701, the second channel region 702, and the third channel region 703 of the second thin film transistor TFT2 may be defined by the second source electrode SE2 and the second drain electrode DE2. In detail, the first channel region 701 may correspond to a first divided semiconductor layer 312a between one of the protrusions of the second source electrode SE2 and one of the protrusions of the second drain electrode DE2, the second channel region 702 may correspond to a second divided semiconductor layer 312b between one of the protrusions of the second source electrode SE2 and the other of the protrusions of the second drain electrode DE2, and the third channel region 703 may correspond to a third divided semiconductor layer 312c between the other of the protrusions of the second source electrode SE2 and the other of the protrusions of the second drain electrode DE2.

As illustrated in FIG. 9B, the third thin film transistor TFT3 may include a single channel region 700.

The second thin film transistor TFT2 and the third thin film transistor TFT3 illustrated in FIGS. 9A and 9B may have substantially the same structure as that of the second thin film transistor TFT2 and the third thin film transistor TFT3 described with reference to FIGS. 8A and 8B. In other words, as illustrated in FIGS. 9A and 9B, the plurality of channel regions included in the second thin film transistor TFT2 may have the same shape and area as those of the channel region included in the third thin film transistor TFT3. In an exemplary embodiment, in FIGS. 9A and 9B, a channel width Wa of the first channel region 701 included in the second thin film transistor TFT2 and a channel width Wb of the channel region 700 included in the third thin film transistor TFT3 may be the same, and a channel length La of the first channel region 701 included in the second thin film transistor TFT2 and a channel length Lb of the channel region 700 included in the third thin film transistor TFT3 may be the same, for example. Similarly, a channel width Wa of the second channel region 702 included in the second thin film transistor TFT2 and the channel width Wb of the channel region 700 included in the third thin film transistor TFT3 may be the same, and a channel length La of the second channel region 702 included in the second thin film transistor TFT2 and the channel length Lb of the channel region 700 included in the third thin film transistor TFT3 may be the same. Similarly, a channel width Wa of the third channel region 703 included in the second thin film transistor TFT2 and the channel width Wb of the channel region 700 included in the third thin film transistor TFT3 may be the same, and a channel length La of the third channel region 703 included in the second thin film transistor TFT2 and the channel length Lb of the channel region 700 included in the third thin film transistor TFT3 may be the same.

In FIGS. 9A and 9B, a ratio between a total channel width of the second thin film transistor TFT2 and a total channel width of the third thin film transistor TFT3 may be 3:1.

Figure 10A:
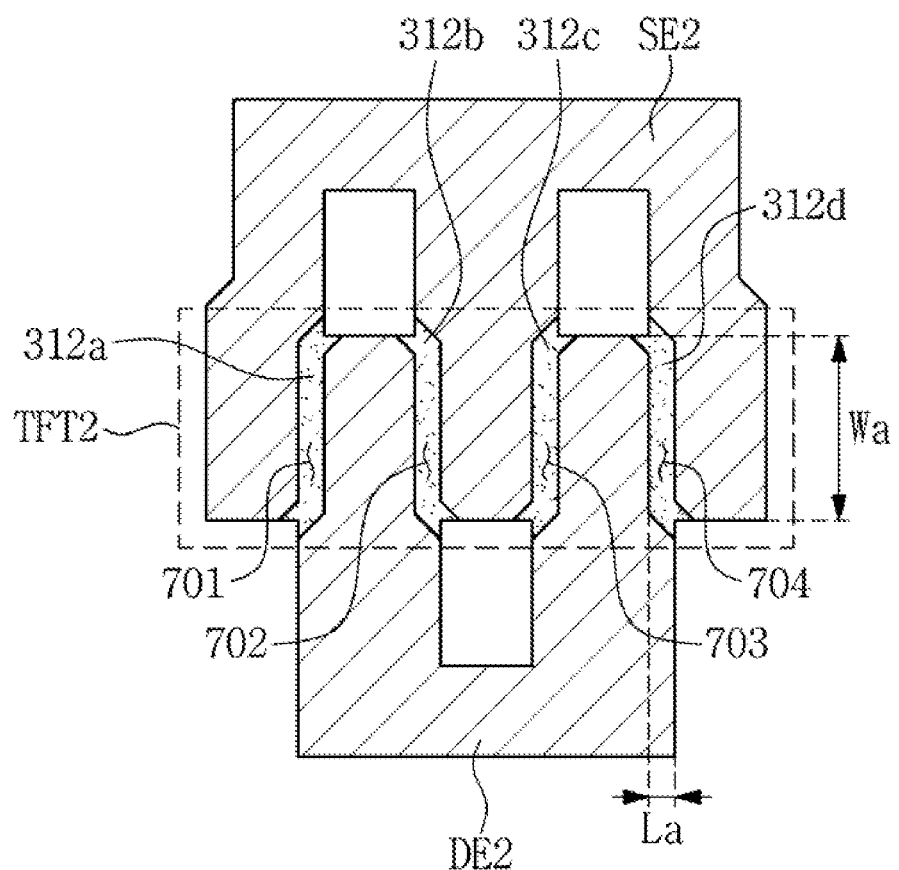
FIGS. 10A and 10B are views illustrating yet another exemplary embodiment of the structure of the second TFT and the third TFT of FIG. 1.
Figure 10B:
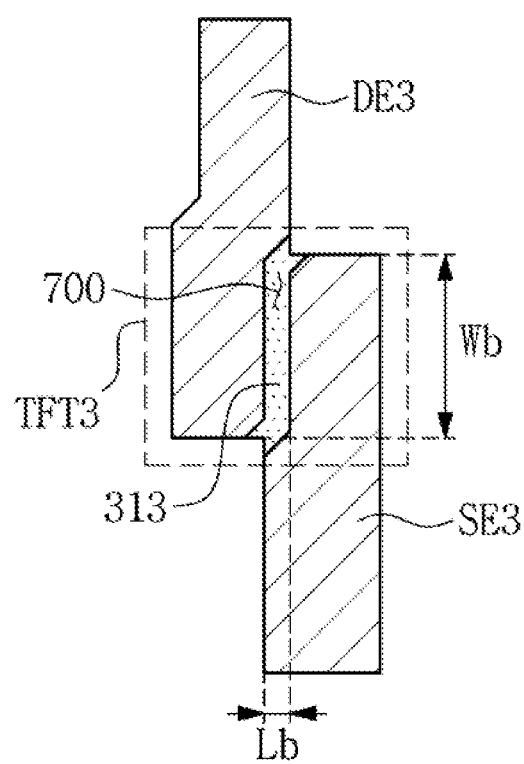

FIGS. 10A and 10B are views illustrating yet another example of the structure of the second thin film transistor TFT2 and the third thin film transistor TFT3 of FIG. 1.

As illustrated in FIG. 10A, the second thin film transistor TFT2 may include a plurality of spaced-apart channel regions. In an exemplary embodiment, the plurality of channel regions may include a first channel region 701, a second channel region 702, a third channel region 703, and a fourth channel region 704 that are divided from one another, for example.

A second source electrode SE2 of the second thin film transistor TFT2 may include three protrusions. A second drain electrode DE2 of the second thin film transistor TFT2 may include two protrusions.

One of the protrusions of the second drain electrode DE2 may be disposed between one and another of the protrusions of the second source electrode SE2. The other of the protrusions of the second drain electrode DE2 may be disposed between another and the other of the protrusions of the second source electrode SE2.

The first channel region 701, the second channel region 702, the third channel region 703, and the fourth channel region 704 of the second thin film transistor TFT2 may be defined by the second source electrode SE2 and the second drain electrode DE2. In detail, the first channel region 701 may correspond to a first divided semiconductor layer 312a between one of the protrusions of the second source electrode SE2 and one of the protrusions of the second drain electrode DE2, the second channel region 702 may correspond to a second divided semiconductor layer 312b between another of the protrusions of the second source electrode SE2 and one of the protrusions of the second drain electrode DE2, the third channel region 703 may correspond to a third divided semiconductor layer 312c between another of the protrusions of the second source electrode SE2 and the other of the protrusions of the second drain electrode DE2, and the fourth channel region 704 may correspond to a fourth divided semiconductor layer 312d between the other of the protrusions of the second source electrode SE2 and the other of the protrusions of the second drain electrode DE2.

As illustrated in FIG. 10B, the third thin film transistor TFT3 may include a single channel region 700.

The second thin film transistor TFT2 and the third thin film transistor TFT3 illustrated in FIGS. 10A and 10B may have substantially the same structure as that of the second thin film transistor TFT2 and the third thin film transistor TFT3 described with reference to FIGS. 8A and 8B. In other words, as illustrated in FIGS. 10A and 10B, the plurality of channel regions included in the second thin film transistor TFT2 may each have the same shape and area as those of the channel region included in the third thin film transistor TFT3. In an exemplary embodiment, in FIGS. 10A and 10B, a channel width Wa of the first channel region 701 included in the second thin film transistor TFT2 and a channel width Wb of the channel region 700 included in the third thin film transistor TFT3 may be the same, and a channel length La of the first channel region 701 included in the second thin film transistor TFT2 and a channel length Lb of the channel region 700 included in the third thin film transistor TFT3 may be the same, for example. Similarly, a channel width Wa of the second channel region 702 included in the second thin film transistor TFT2 and the channel width Wb of the channel region 700 included in the third thin film transistor TFT3 may be the same, and a channel length La of the second channel region 701 included in the second thin film transistor TFT2 and the channel length Lb of the channel region 700 included in the third thin film transistor TFT3 may be the same. Similarly, a channel width Wa of the third channel region 703 included in the second thin film transistor TFT2 and the channel width Wb of the channel region 700 included in the third thin film transistor TFT3 may be the same, and a channel length La of the third channel region 703 included in the second thin film transistor TFT2 and the channel length Lb of the channel region 700 included in the third thin film transistor TFT3 may be the same. Similarly, a channel width Wa of the fourth channel region 704 included in the second thin film transistor TFT2 and the channel width Wb of the channel region 700 included in the third thin film transistor TFT3 may be the same, and a channel length La of the fourth channel region 704 included in the second thin film transistor TFT2 and the channel length Lb of the channel region 700 included in the third thin film transistor TFT3 may be the same.

In FIGS. 10A and 10B, a ratio between a total channel width of the second thin film transistor TFT2 and a total channel width of the third thin film transistor TFT3 may be 4:1.

The third thin film transistor TFT3 may include the number of channel regions "n" times ("n" being a natural number) greater than the number of channel regions included in the second thin film transistor TFT2. In an exemplary embodiment, the number of channel regions included in the third thin film transistor TFT3 may be "n" times greater than the number of channel regions included in the second thin film transistor TFT2, for example.

FIG. 11 is a view illustrating effects of the exemplary embodiment.

Referring to FIG. 11, a second thin film transistor TFT2' may be a conventional second thin film transistor TFT2 equivalent to the second thin film transistor TFT2 according to the exemplary embodiment, and the conventional second thin film transistor TFT2' may include a single channel region having a different area than that of the third thin film transistor TFT3 according to the exemplary embodiment in size.

In FIG. 11, Wmin denotes a minimum channel width of the third thin film transistor TFT3 according to the exemplary embodiment, the conventional TFT2', and the second thin film transistor TFT2 according to the exemplary embodiment, and Wmax denotes a maximum channel width of the third thin film transistor TFT3 according to the exemplary embodiment, the conventional TFT2', and the second thin film transistor TFT2 according to the exemplary embodiment. ΔW denotes a variation range between the minimum channel width and the maximum channel width.

When a channel width (total channel width) of the second thin film transistor TFT2 and a channel width (total channel width) of the third thin film transistor TFT3 that are provided in FIG. 11 have a ratio, for example, 2:1 (the ratio of the channel width of the second thin film transistor TFT2 to the channel width of the third thin film transistor TFT3 is 2), as previously described with reference to FIGS. 8A and 8B, a simulation result with regard to the structure of the second thin film transistor TFT2 according to the exemplary embodiment indicates 2.18 (=2.64/1.21), which is substantially approximate to the ratio in FIGS. 8A and 8B. A simulation result with regard to the structure of the conventional second thin film transistor TFT2' indicates 0.86 (=1.04/1.21), which is significantly lower than 2, which is the ratio obtained in the second thin film transistor TFT2 according to the exemplary embodiment.

As set forth above, according to one or more exemplary embodiments, in the display device, the plurality of channel regions included in the second thin film transistor may each have the same shape and area as those of the channel region included in the third thin film transistor. Accordingly, the resistance ratio between the transistors may be readily predicted, thus resulting in the simplified design and manufacture of the transistor.

In addition, the source electrode and the drain electrode may include the same number of protrusions. Accordingly, the voltage deviation caused by the varying polarity of the data voltage may be significantly reduced.

From the foregoing, it will be appreciated that various embodiments in accordance with the disclosure have been described herein for purposes of illustration, and that various modifications may be made without departing from the scope and spirit of the teachings. Accordingly, the various embodiments disclosed herein are not intended to be limiting of the true scope and spirit of the teachings. Various features of the above described and other embodiments can be mixed and matched in any manner, to produce further embodiments consistent with the invention.

What is claimed is:

1. A liquid crystal display device comprising:
   a first substrate comprising a gate line and a data line;
   a second substrate opposing the first substrate;
   a liquid crystal layer between the first substrate and the second substrate;
   a first sub-pixel electrode in a first sub-pixel region of the first substrate;
   a second sub-pixel electrode in a second sub-pixel region of the first substrate;
   a first transistor connected to the gate line, the data line, and the first sub-pixel electrode;
   a second transistor connected to the gate line, the first transistor, and the second sub-pixel electrode; and
   a third transistor connected to the gate line, the second sub-pixel electrode, and a storage line,
   wherein the second transistor comprises a plurality of divided channel regions;
   wherein one of the plurality of divided channel regions of the second transistor has the same shape and area as a shape and an area of the channel region of the third transistor.

2. The liquid crystal display device of claim 1, wherein a number of the plurality of divided channel regions of second transistor is "n" times ("n" being a natural number) greater than a number of channel regions of one the first and third transistors.

3. The liquid crystal display device of claim 2, wherein a number of the plurality of divided channel regions of the second transistor is "n" times greater than a number of channel regions of the third transistor.

4. The liquid crystal display device of claim 1, wherein a number of channel regions of the first transistor is equal to a number of channel regions of the third transistor.

5. The liquid crystal display device of claim 1, wherein a source electrode and a drain electrode included in the one of the first, second and third transistors have a same number of protrusions.

6. The liquid crystal display device of claim 1, wherein a total area of the plurality of divided channel regions included in the second transistor is greater than the area of the channel region included in the third transistor.

7. The liquid crystal display device of claim 1, wherein respective end portions of a source electrode and a drain electrode facing one another of at least one of the first, second, and third transistors have a curved shape.

8. The liquid crystal display device of claim 7, wherein the end portion of the source electrode and the end portion of the drain electrode each include a plurality of sides having different lengths.

9. The liquid crystal display device of claim 8, wherein the end portion of the source electrode and the end portion of the drain electrode each include sides having the different lengths at respective corresponding positions.

10. The liquid crystal display device of claim 7, wherein the end portion of the source electrode has a same length as a length of the end portion of the drain electrode facing one another.

* * * * *